US006766933B1

(12) United States Patent
Wang

(10) Patent No.: US 6,766,933 B1
(45) Date of Patent: Jul. 27, 2004

(54) AUTOMOBILE ESCAPE HAMMER GUN

(76) Inventor: Tien-Shui Wang, No. 232, Toutan Rd., Shalu Chen, Taichung Hsien (TW)

( * ) Notice: Subject to any disclaimer, the term of this patent is extended or adjusted under 35 U.S.C. 154(b) by 0 days.

(21) Appl. No.: 10/635,285

(22) Filed: Aug. 6, 2003

(51) Int. Cl.[7] .................................................. B26F 1/00
(52) U.S. Cl. ............................. 225/93; 7/100; 7/158; 362/89; 362/119; 225/94; 173/202; 30/367
(58) Field of Search ..................... 30/367, 142, 123, 30/293, 294, DIG. 3; 7/100, 144, 158; 173/121, 202; 362/119, 89; 225/93, 94, 104; 227/132; 83/743–745

(56) References Cited

U.S. PATENT DOCUMENTS

| | | | | |
|---|---|---|---|---|
| 2,762,435 A | * | 9/1956 | Morris et al. ................. 30/367 |
| 2,783,670 A | * | 3/1957 | Graves et al. ................ 30/367 |
| 2,787,179 A | * | 4/1957 | Warner ........................ 30/367 |
| 3,176,399 A | * | 4/1965 | Marino et al. ................ 30/367 |
| 3,494,431 A | * | 2/1970 | Yoho et al. ................... 30/367 |
| 4,592,467 A | * | 6/1986 | Lechner ........................ 7/144 |
| 4,685,213 A | * | 8/1987 | Powers ........................ 30/123 |
| 5,251,351 A | * | 10/1993 | Klotz ............................ 7/100 |
| 5,477,601 A | * | 12/1995 | Jasmer ......................... 7/158 |
| 5,642,567 A | * | 7/1997 | Lin .............................. 7/100 |
| 5,903,942 A | * | 5/1999 | Hasegawa ..................... 7/144 |
| 6,454,430 B1 | * | 9/2002 | Lin ............................ 362/119 |
| 6,574,816 B2 | * | 6/2003 | Yu Chen ....................... 7/100 |
| 6,592,236 B1 | * | 7/2003 | Lin ............................ 362/119 |
| 2003/0089755 A1 | * | 5/2003 | Peers-Smith et al. ....... 225/103 |

* cited by examiner

Primary Examiner—Jason D. Prone
(74) Attorney, Agent, or Firm—William E. Pelton, Esq.

(57) ABSTRACT

An automobile escape hammer gun includes a body, a striking hammer and a lever. The body has a front and a lower passage formed in the body at the front. The striking hammer is movably mounted in the lower passage, is spring-loaded and has a bottom tip extending out of the body and an annular lip with a bottom formed in the body. The lever mounted pivotally in the body and has an inside end abuts the bottom of the annular lip and an outside end extends out of the body. Therefore, when the lever is pivoted, the inside end of the lever moves the striking hammer into the body. The bottom tip of striking hammer will impact rapidly a window of a vehicle to break efficiently the window when the annular lip escapes from the front end of the lever.

4 Claims, 4 Drawing Sheets

AUTOMOBILE ESCAPE HAMMER GUN

BACKGROUND OF THE INVENTION

1. Field of the Invention

The present invention relates to an automobile escape hammer, and more particularly to a gun-shaped automobile escape hammer having a spring-loaded striking hammer to break efficiently and quickly side windows of a vehicle.

2. Description of Related Art

With reference to FIG. 4, an automobile escape hammer is a potential lifesaver in a vehicle crash or car accident as it prevents people being trapped in the vehicle. The automobile escape hammer in accordance with the prior art comprises a body (60), a metal head (61) and a blade (62). The body (60) has a top (not numbered), a grip (601) and a cutter slot (602) defined near the top. The metal head (61) is attached to the body (60) near the top and has a tip (611). The blade (62) is longitudinally mounted and received in the cutter slot (602).

In a situation of a vehicle accident, a user can hold the grip (601) and strike a side window of the vehicle perpendicular to its surface with the tip (611) using a snapping motion to break the window in order to escape from the vehicle. To cut the seatbelt, the user holds the grip (601) of the hammer, pulls the belt taut, and inserts the belt into the cutter slot (602), whereafter the user pulls the blade (62) across the cutter slot (602) to cut off the seatbelt.

However, in an emergency, to strike the window perpendicular to its surface with the tip (601) sometimes is not easy to be achieved due to the shock of the vehicle's occupants etc. A full-strength force is required for the hammer to break the window, otherwise the hammer might not be able to break the window such that the people inside the vehicle cannot escape from the vehicle as quickly as possible. Therefore, the automobile escape hammer in accordance with the prior art is inconvenient in use.

Besides, since the seat belt is always tough to cut, the seat belt will easily crinkle or become folded in the cutter slot (602) whereby the seat belt becomes jammed in the cutter slot (602). In such a state, it is almost impossible to cut the seat belt efficiently.

To overcome the shortcomings, the present invention provides an automobile hammer gun to mitigate or obviate the aforementioned problems.

SUMMARY OF THE INVENTION

The main objective of the invention is to provide an automobile hammer gun having a spring-loaded striking hammer to strike efficiently a window of a crashed vehicle to help people inside the vehicle to escape quickly.

Other objectives, advantages and novel features of the invention will become more apparent from the following detailed description when taken in conjunction with the accompanying drawings.

DETAILED DESCRIPTION OF PREFERRED EMBODIMENTS

Figure 1:
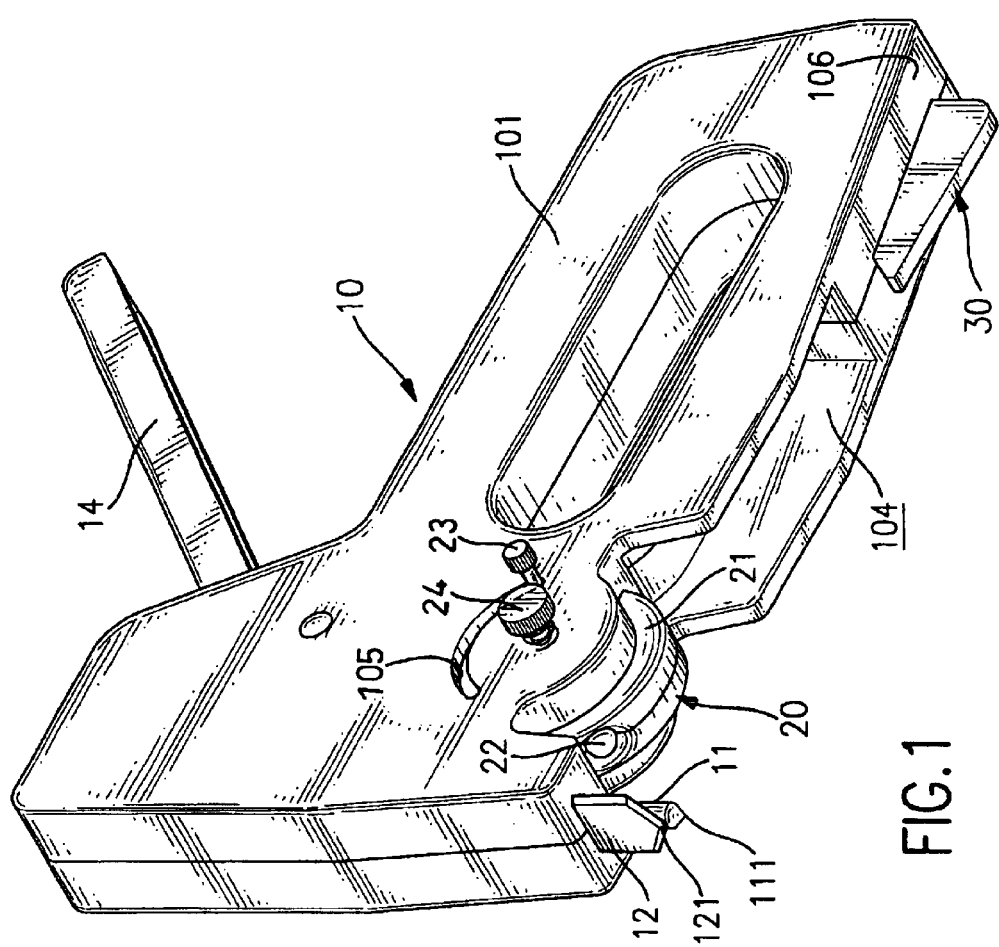
FIG. 1 is a perspective view of an automobile hammer gun in accordance with the present invention.
Figure 2:
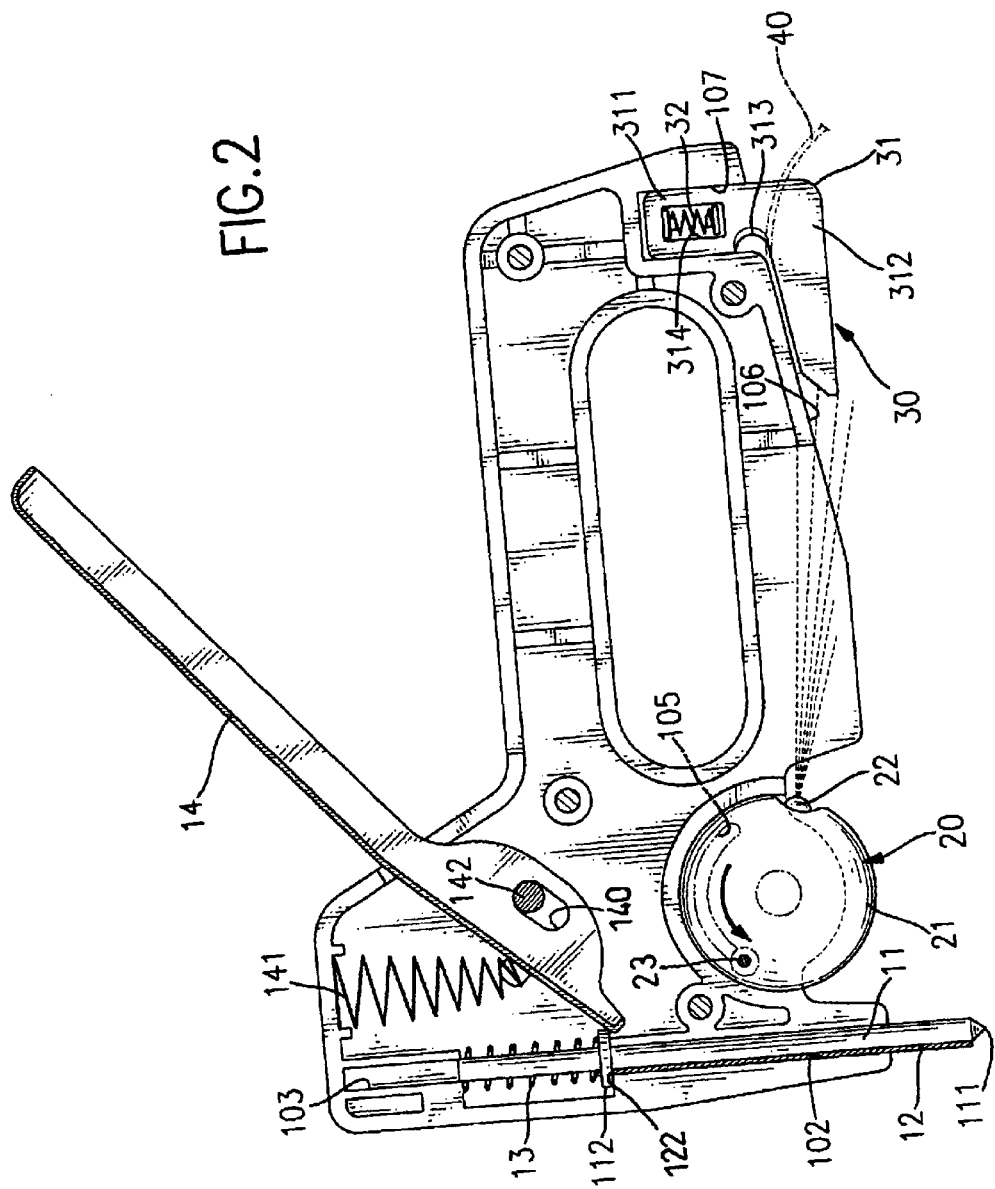
FIG. 2 is a cross sectional plan view of the automobile hammer gun in FIG. 1.

With reference to FIGS. 1 and 2, an automobile hammer gun in accordance with the present invention comprises a body (10), a striking assembly (not numbered), an illuminating assembly (20) and a cutter assembly (30). The body (10) is hollow and comprises two half shells (not numbered) that connect to each other. The body (10) has an inside (not numbered), a front (not numbered), a rear (not numbered), a top (not numbered), a bottom (not numbered), a grip (101), a lower passage (102), an upper passage (103), a bottom recess (104), a curved slot (105), an inclined guide (106) and a cutter passage (107). The lower and upper passages (102, 103) are respectively formed in the body (10) at the front and are aligned with each other. The bottom recess (104) is defined in the bottom of the body (10). The cutter passage (107) is defined in the bottom near the rear of the body (10). The curved slot (105) is defined in the body (10) between the lower passage (102) and the bottom recess (104). The inclined guide (106) is defined in the bottom of the body (10) and extends toward the rear of the body (10).

The striking assembly is mounted in the inside of the body (10) at the front and comprises a striking hammer (11), an adhesive film cutter (12), a compression spring (13) and a lever assembly (not numbered). The striking hammer (11) is cylindrical and moveably mounted in the lower and upper passages (102, 103). The striking hammer (11) further has a bottom tip (111) and an annular lip (112). The bottom tip (111) extends out of the lower passage (102) of the body (10) with a length (not shown). The annular lip (112) is formed outside the lower passage (102) and inside the body (10), and has a bottom (not numbered). The adhesive film cutter (12) is movably mounted in the lower passage (102) and is moved simultaneously with the striking hammer (11). The adhesive film cutter (12) has a triangular blade edge (121) and a slot (122). The triangular blade edge (121) extends out of the lower passage (102) of the body (10) with a length shorter than that of the bottom tip (111). The slot (122) of the adhesive film cutter (12) engages and holds the annular lip (112) of the striking hammer (12), so the adhesive film cutter (12) will be moved in accompaniment with the striking hammer (11).

The compression spring (13) is mounted around the striking hammer (11) between the annular lip (112) and the upper passage (103) in the body (10) and has two ends (not numbered) that abut respectively against the annular lip (112) and the body (10). The lever assembly is mounted in the body (10) and comprises a lever (14), a restitution spring (141) and a stationary pin (142). The lever (14) has an inside end (not numbered), an outside end (not numbered) and an elongated hole (140). The inside end of the lever (14) abuts the bottom of the annular lip (112) of the striking hammer (12) to lift the striking hammer (11) to retract inward the body (10). The outside end of the lever (14) extends out of the body (10) and corresponds to the grip (101). The restitution spring (141) is mounted in the body (10) and connects to the lever (14) to provide a restitution force to return the lever (14) when the lever (14) is released. The stationary pin (142) is fixed in the body (10) and is slidably mounted in the elongated hole (140) of the lever (14).

The illuminating assembly (20) is mounted on the body (10) and comprises a rotator (21), an illuminating member (22), an adjusting bar (23) and a rotatable switch (24). The rotator (21) is rotatably mounted in the body (10) corresponding to the curved slot (105) and has two flexible casings (not numbered), a circular outer edge (not numbered) and a battery (not shown) inside. The flexible casings connect to each other to contain the battery. The illuminating member (22), such as a light emitting diode (LED), is mounted at the circular outer edge of the rotator (21) and has a first leg (not shown) and a second leg (not shown). The first leg connects electrically to the battery, and the second leg is separated from but corresponds to the battery. More than one illuminating member (22) can be fitted to the hammer. The illuminating member (22) will produce light when the flexible casing of the rotator (22) is pressed to make both the legs of the illuminating member (22) connecting electrically to the battery to activate the illuminating member (22) whereby a user is able to see the area of glass to be struck. The adjusting bar (23) is slidably mounted in the curved slot (105) and has an inside end (not shown) inserted into the curved slot (105) to connect to the rotator (21). Thereafter, the rotator (21) can be rotated by turning the adjusting bar (23) to change an angle of the rotator (21). The rotatable switch (24) is rotatably mounted in the body (10) with threads that correspond to the rotator (21) and has an inside end (not shown) for screwing into the body (10). The rotatable switch (24) can be retracted into or extended out of the body (10). Thereafter, when the rotatable switch (24) is turned to retract into the body (10), the inside end of the rotatable switch (24) will press the flexible casing of the rotator (21) to light the illuminating member (22).

The cutter assembly (30) is mounted at the rear of the body (10) and comprises an L-shaped seat belt cutter (31) and a restitution spring (32) with two ends (not numbered). The seat belt cutter (31) has a corner (not numbered), an inside portion (311), an outside portion (312), a curved blade (313) and a spring hole (314). The inside portion (311) of the seat belt cutter (31) is movably mounted in the cutter passage (107). The outside portion (312) of the seat belt cutter (31) abuts on the inclined guide (106) and is flush with the bottom of the body (10). The curved blade (313) is formed in the corner between the inside and the outside portions (311, 312). The spring hole (314) has an edge (not numbered) and is defined in the inside portion (311) to receive the restitution spring (32). The two ends of the restitution spring (32) abut respectively on the edge of the spring hole (314) and the body (10), so the restitution spring (32) will provide a restitution force as it is compressed.

Thereafter, when a seat belt (40) needs to be cut, the seat belt (40) is pulled taut on the inclined guide (106) and the seat belt (40) is slid into between the inclined guide (106) and the outside portion (312). The inclined guide (106) smoothens the taut seat belt (40) to be without folds such that the seat belt (40) is in an optimum condition for the curved blade (313) to cut it. When the operation of cutting the seat belt (40) is completed, the restitution force caused by the restitution spring (32) returns the seat belt cutter (31) and the outside portion (312) abuts on the inclined guide (106) again to be behind the curved blade (313).

Figure 3:
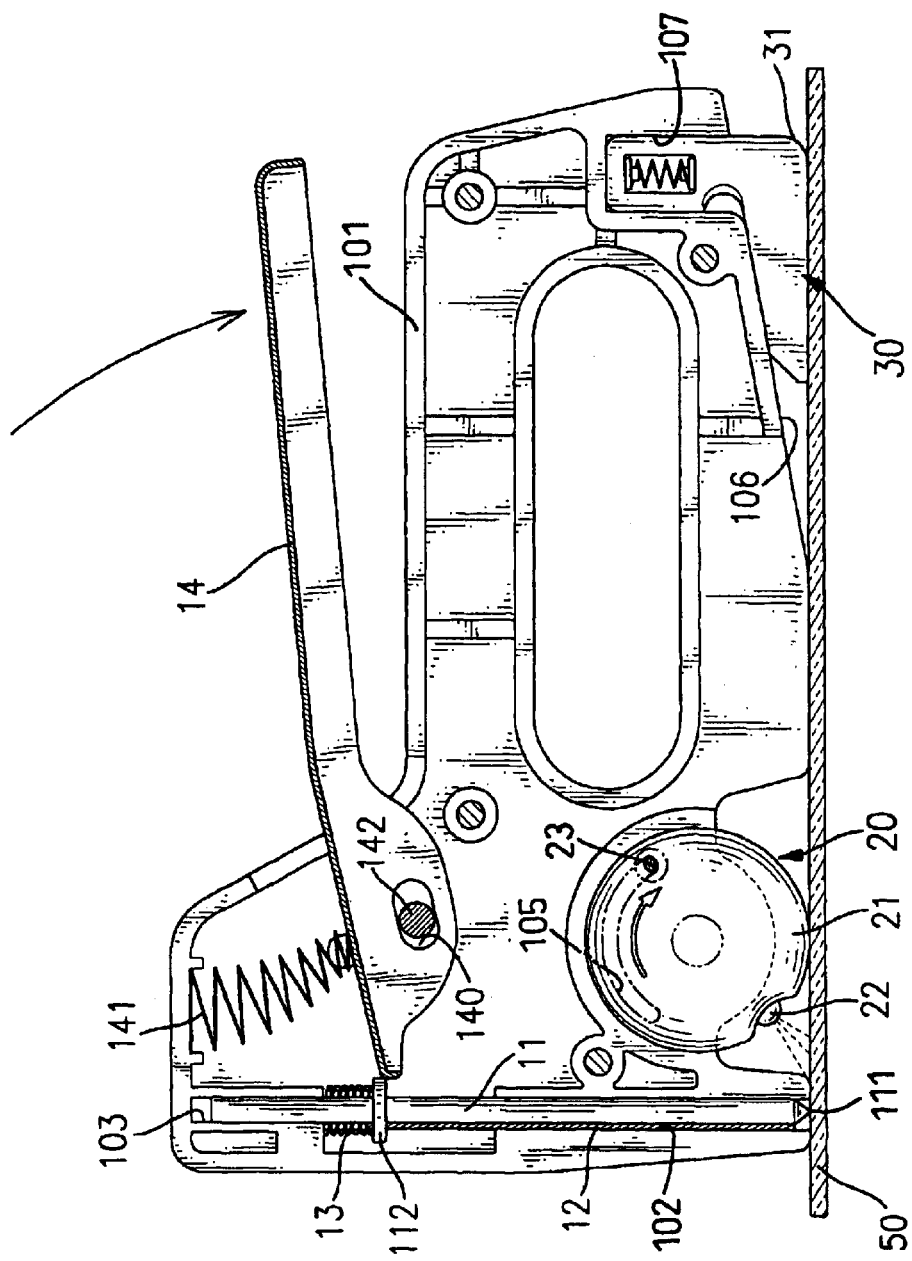
FIG. 3 is an operational cross sectional plan view when a lever of the automobile hammer gun is squeezed to move inward a striking hammer.
Figure 4:
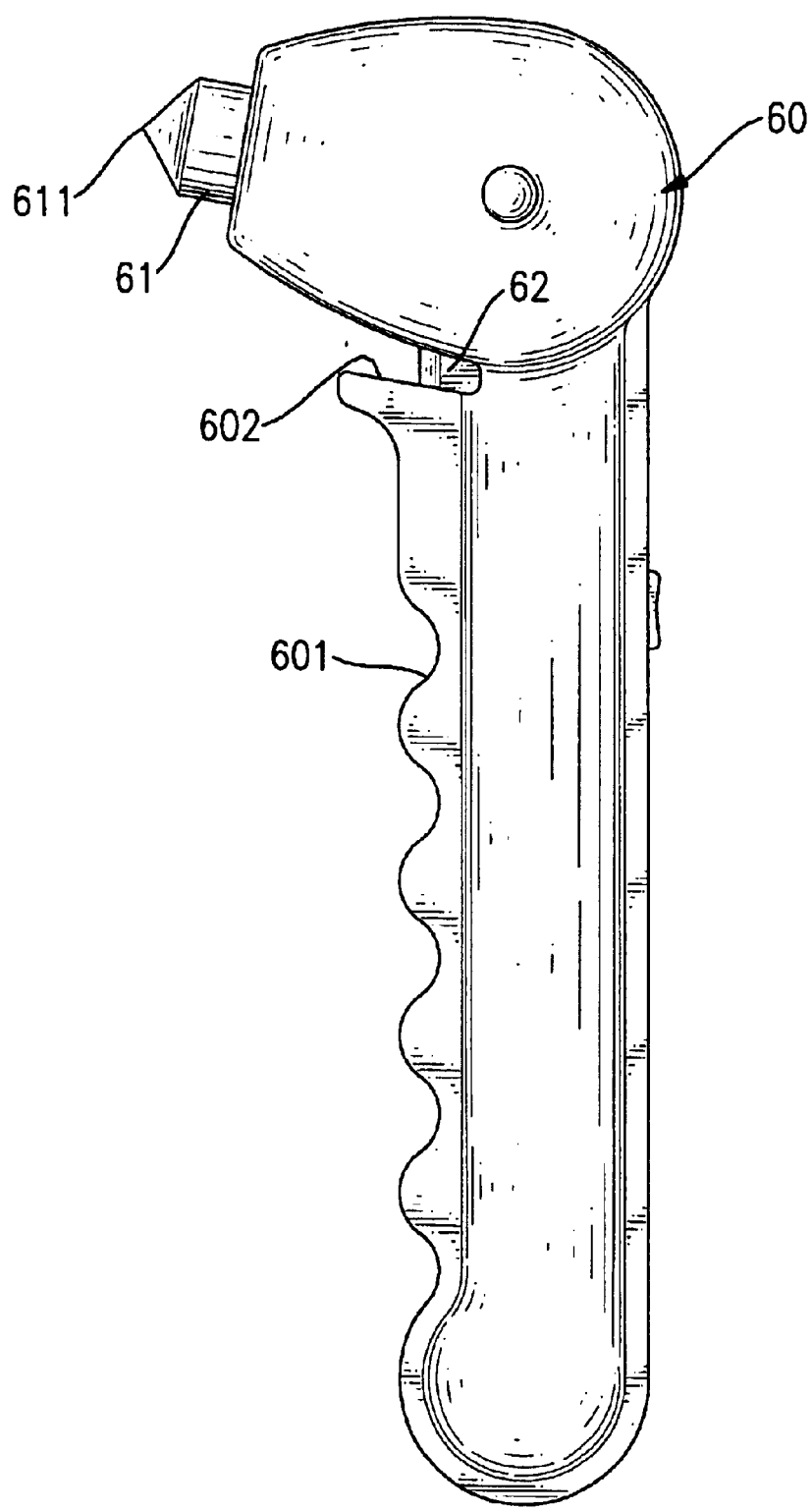
FIG. 4 is a plan view of an automobile escape hammer in accordance with the prior art.

With reference to FIGS. 1 and 3, when the automobile hammer gun is applied to break a side window (50) of a vehicle (not shown), the lever (14) is squeezed toward the grip (101). The inside end of the lever (14) lifts the annular lip (112) into the body (10) such that the striking hammer (11) and the adhesive film cutter (12) will be simultaneously moved inward to retract into the body (10) with a given stroke. Thereafter, the bottom of the body (10) contacts approximately with the side window (50) to serve the striking hammer (11) almost perpendicularly to the side window (50). Continuously squeezing the lever (14) toward the grip (101) makes the lever (14) slide along the stationary pin (142) until the annular lip (112) escapes from the inside end of the lever (14). The compression spring (13) provides a spring force to move outward the striking hammer (11), so the tip (111) rapidly impacts and so breaks the side window (50). Most of all the side windows (50) are composed of a layer of adhesive film (not shown), such as polyester film to adhere different layers of glass together, the triangular blade edge (121) of the adhesive film cutter (12) can cut or break this adhesive film to completely break the side window (50) after the tip (111) of the striking hammer (11) has broken the layers of glass.

If in a low visibility situation, the rotatable switch (24) can be turned to retract into the body (10) and press one of the flexible casings of the rotator (21) to actuate the illuminating member (22). Rotation of the adjusting bar (23) can change an angular position of the illuminating member (22) to illuminate either the tip (111) or the seat belt cutter (31) through the bottom recess (14) for operating conveniently them.

The automobile escape hammer gun in accordance with the present invention has the aforesaid advantages and overcomes the shortcomings of the conventional automobile escape hammer. The tip (111) of the striking hammer (11) can strike the window almost perpendicularly to the window's surface, so the tip (11) will efficiently break the window. The seat belt (40) is smoothened on the inclined guide (106) to be cut by the curved blade (313), so the seat belt will be conveniently cut.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. An automobile escape hammer gun comprising:
    a body with an inside, a front, a rear, top and a bottom the body having a grip, a lower passage formed inside the body at the front, an inclined guide defined in the bottom of the body and extending toward the rear of the body and a cutter passage defined in the bottom near the rear of the body;
    a striking assembly mounted in the inside of the body at the front and comprising
        a striking hammer movably mounted in the lower passage and having a bottom tip extending out of the lower passage of the body with a length and an annular lip with a bottom formed outside the lower passage and inside the body;
        an adhesive film cutter movably mounted in the lower passage and having a triangular blade edge extending out of the lower passage of the body with a length shorter than the length of the bottom tip of the striking hammer extending out from the lower passage, and a slot engaging the annular lip; and
        a compression spring mounted around the striking hammer and having two ends that abut respectively against the annular lip and the body;
    a lever assembly mounted in the body and comprising
        a lever mounted pivotally in the body and having an inside end abutting the bottom of the annular lip of the striking hammer to move the striking hammer to retract inward the body, an outside end extending out of the body and an elongated hole;

a restitution spring mounted in the body and connecting to the lever to provide a restitution force to return the lever; and a stationary pin slidably mounted in the elongated hole of the lever and fixed in the body; and a cutter assembly mounted at the rear of the body and comprising an L-shaped seat belt cutter mounted movably in the cutter passage and having a corner, an inside portion mounted movably in the cutter passage, an outside portion abutting on the inclined guide and being flush with the bottom of the body, and a curved blade formed in the corner between the inside and outside portions.

2. The automobile escape hammer gun as claimed in claim 1 further comprising an illuminating assembly mounted in the body and the illuminating assembly comprising a rotator mounted rotatably in the body and having two flexible casing and a circular outer edge;

a battery contained by the flexible casings; and at least one illuminating member mounted at the circular outer edge of rotator to produce light for illumination, each of the at least one illuminating member having a first leg and a second leg, wherein the first leg connects electrically to the battery and the second leg connects electrically to the battery as the flexible casings are pressed.

3. The automobile escape hammer gun as claimed in claim 2, wherein the body further has a curved slot defined in the body and between the lower passage and the bottom recess, and the illuminating assembly further comprises an adjusting bar mounted slidably in the curved slot and having an inside end inserted into the curved slot to connect to the rotator; and a rotatable switch mounted rotatably in the body by means of threads and having an inside end screwing into the body to press selectively one of the flexible casings of the rotator to actuate the at least one illuminating member to produce light.

4. The automobile escape hammer gun as claimed in claim 3, wherein each of the at least one illuminating member is a light emitting diode (LED).

\* \* \* \* \*